(12) United States Patent
Lai et al.

(10) Patent No.: US 8,034,262 B2
(45) Date of Patent: *Oct. 11, 2011

(54) OPTICAL ELEMENT FOR STABILIZING REFRACTIVE INDEX PROFILES USING POLYMER MIXTURES

(75) Inventors: Shui T. Lai, Encinitas, CA (US); Donald G. Bruns, San Diego, CA (US); Lawrence H. Sverdrup, Poway, CA (US); Gomaa Abdel-Sadek, San Diego, CA (US)

(73) Assignee: Ophthonix, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,061

(22) Filed: Aug. 10, 2010

(65) Prior Publication Data

US 2010/0302504 A1     Dec. 2, 2010

Related U.S. Application Data

(60) Continuation of application No. 12/361,498, filed on Jan. 28, 2009, now Pat. No. 7,772,297, which is a division of application No. 10/935,799, filed on Sep. 7, 2004, now abandoned.

(51) Int. Cl.
  *C08J 3/28* (2006.01)
  *C08F 2/50* (2006.01)
  *G02B 1/04* (2006.01)
  *G02B 1/00* (2006.01)

(52) U.S. Cl. ....... 264/1.32; 522/168; 522/170; 522/182; 522/178; 522/181; 522/180; 522/109; 522/110; 522/111; 522/112; 264/1.1; 264/1.31; 264/1.36; 264/1.38; 264/2.4; 523/106

(58) Field of Classification Search ................. 522/168, 522/170, 178, 182, 181, 180, 109, 110, 111, 522/112, 100, 104, 103, 106, 108, 113, 118, 522/120, 119, 121, 122; 523/106, 107, 108; 264/1.1, 1.31, 1.32, 1.36, 1.38, 2.4

See application file for complete search history.

(56) References Cited

U.S. PATENT DOCUMENTS

| | | | |
|---|---|---|---|
| 5,064,712 | A | 11/1991 | Fretz, Jr. |
| 5,236,970 | A | 8/1993 | Christ et al. |
| 5,807,906 | A | 9/1998 | Bonvallot et al. |
| 6,391,983 | B1 | 5/2002 | Bateman et al. |
| 0,080,464 | A1 | 6/2002 | Bruns |
| 6,450,642 | B1 | 9/2002 | Jethmalani et al. |
| 0,143,391 | A1 | 7/2003 | Lai |
| 6,630,083 | B1 | 10/2003 | Nunez et al. |
| 0,008,319 | A1 | 1/2004 | Lai et al. |
| 6,712,466 | B2 | 3/2004 | Dreher |
| 6,786,602 | B2 | 9/2004 | Abitbol |
| 7,217,375 | B2 | 5/2007 | Lai |

OTHER PUBLICATIONS

Jacobine, Anthony, "Radiation Curing Polymer Science and Technology," vol. 3, Ed. by J.P. Fouassier and J.F. Rabek, Elsevier Applied Science, pp. 219-268.

U.S. Appl. No. 10/935,798, filed Sep. 7, 2004, entitled "Method of Manufacturing an Optical Lens".

U.S. Appl. No. 10/936,030, filed Sep. 7, 2004, entitled "Monomers and Polymers for Optical Elements".

U.S. Appl. No. 10/848,942, filed May 18, 2004, entitled "Apparatus and Method for Curing of UV-Protected UV-Curable Monomer and Polymer Mixtures".

*Primary Examiner* — Sanza L McClendon

(74) *Attorney, Agent, or Firm* — Morrison & Foerster LLP

(57) ABSTRACT

An optical element comprising: a first monomer polymerized while in the presence of a second monomer to form a first polymer intermixed with the second monomer, the first polymer having a spatially varying degree of cure that provides a predetermined refractive index profile; and the second monomer polymerized in the presence of the first polymer to form a second polymer intermixed with the first polymer, the second polymer stabilizing the refractive index profile.

20 Claims, 6 Drawing Sheets

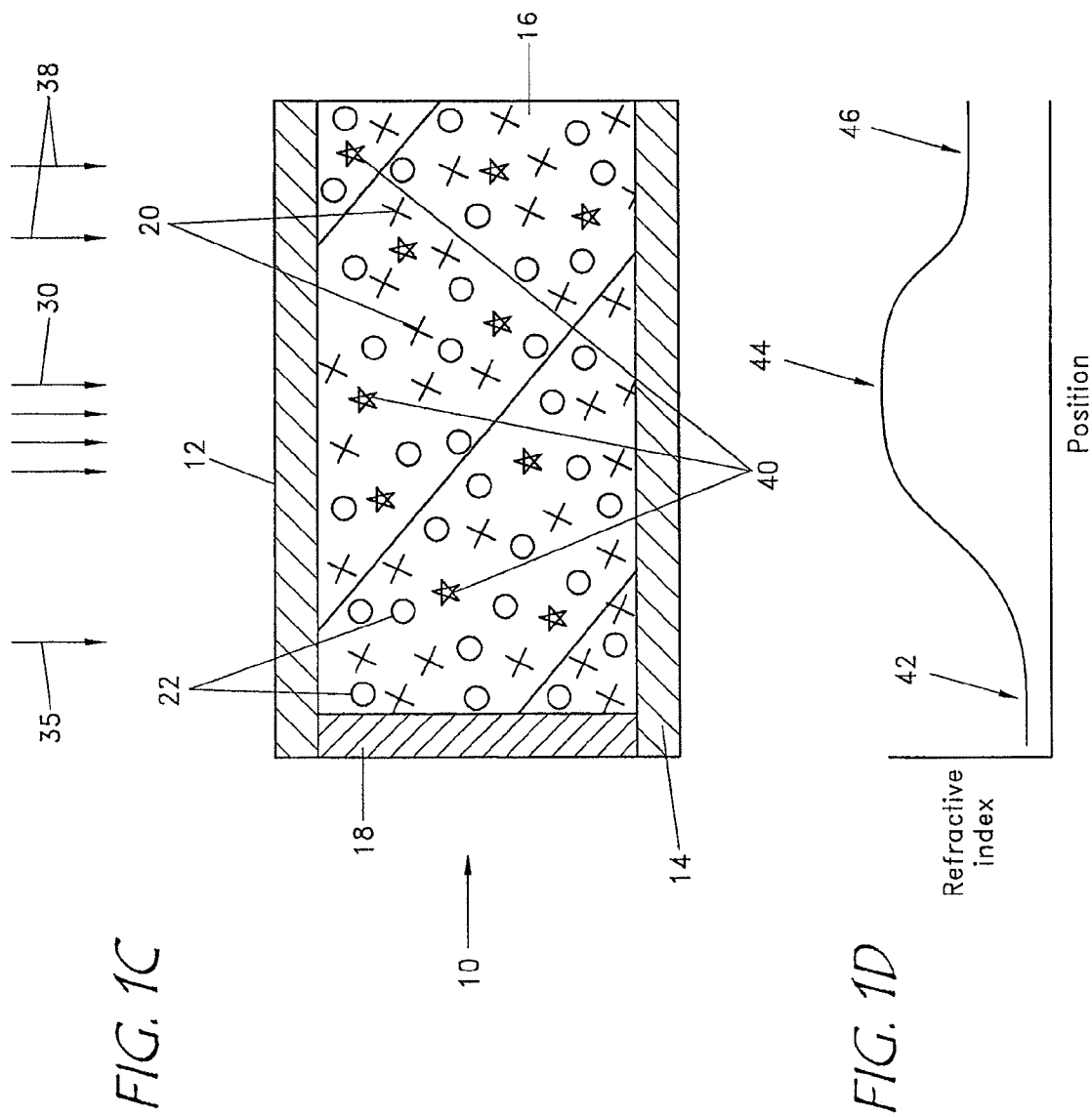

OPTICAL ELEMENT FOR STABILIZING REFRACTIVE INDEX PROFILES USING POLYMER MIXTURES

CROSS-REFERENCE TO RELATED APPLICATIONS

This application is a Continuation of U.S. Utility patent application Ser. No. 12/361,498 filed Jan. 28, 2009, which is a Divisional of U.S. Utility patent application Ser. No. 10/935,799 filed Sep. 7, 2004, the contents of which are incorporated by reference herein in their entirety.

BACKGROUND OF THE INVENTION

1. Field of the Invention

This invention relates generally to optical elements, such as corrective lenses. More particularly, this invention relates to optical elements containing two or more polymers.

2. Description of the Related Art

Many optical systems such as the human eye contain aberrations. In attempting to correct for such aberrations, it is common to assume that the light passing through the system is limited to paraxial rays, specifically, rays that are near the optical axis and that are contained within small angles. Corrective optics produced according to this assumption generally have only spherical surfaces. For example, it is typically assumed that ocular imperfections in the human eye are limited to lower order imperfections, including the imperfections commonly called "astigmatism" and "defocus", that can be corrected by lenses having spherical surfaces. However, higher order imperfections can exist, including but not limited to imperfections known as "coma" and "trefoil." These imperfections unfortunately cannot be corrected by conventional glasses or contact lenses, leaving patients with less than optimum vision even after the best available corrective lenses have been prescribed.

Moreover, it is often difficult to simultaneously minimize all aberrations. Indeed, corrections to an optical system to minimize one type of aberration may result in the increase in one of the other aberrations. For example, decreasing coma can result in increasing spherical aberrations. Furthermore, it is often necessary to correct aberrations in an optical system that are introduced during manufacturing. This process can be iterative and time consuming, requiring, as it does, assembly, alignment, and performance evaluation to identify aberrations, followed by disassembly, polishing or grinding to correct the aberrations, and then reassembling and retest. Several iterations might be needed before a suitable system is developed.

U.S. patent application Ser. No. 09/875,447, filed Jun. 4, 2001, entitled "Wavefront Aberrator and Method of Manufacturing," discloses, inter alia, a method for making a wavefront aberrator by using a photopolymerization method to change the refractive index of a polymer. A refractive index profile may be formed by selectively curing the polymer on a region-by-region basis by exposure to radiation (e.g., UV light). The refractive index of the exposed polymer in the selected regions increases, but the resulting refractive index profile is not permanent, and over time, the refractive index profile changes and the amplitude of the induced refractive index change tends to decrease over time.

SUMMARY OF THE INVENTION

A preferred embodiment provides an optical element comprising a first optical cover, a second optical cover, and a layer of polymeric material sandwiched between the first optical cover and the second optical cover, wherein the polymeric material comprises a mixture of a first polymer and a second polymer, the first polymer having a spatially varying degree of cure that provides a predetermined refractive index profile, and the second polymer being cured to thereby stabilize the refractive index profile.

Another preferred embodiment provides a method for making an optical element, comprising:

polymerizing a first monomer to form a first polymer, the first polymer having a spatially varying degree of cure that provides a predetermined refractive index profile; and polymerizing a second monomer in the presence of the first polymer to form a second polymer intermixed with the first polymer, the second polymer stabilizing the refractive index profile.

Another preferred embodiment provides a method for making an ophthalmic lens, comprising:

forming a mixture comprising a first monomer, a second monomer, a first photoinitiator, and a second photoinitiator;

placing the mixture between a first optical cover and a second optical cover;

exposing the mixture to a first radiation source, thereby polymerizing the first monomer to form a first polymer, the first polymer having a spatially varying degree of cure that provides a predetermined refractive index profile; and exposing the second monomer to a second radiation source, thereby polymerizing the second monomer to form a second polymer intermixed with the first polymer These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein:

FIG. 1C is a cross-section view schematically illustrating selective polymerization to form a polymer having a spatially varying degree of cure that provides a predetermined refractive index profile. FIG. 1D is a plot schematically illustrating the refractive index profile resulting from the selective polymerization illustrated in FIG. 1C.

DETAILED DESCRIPTION OF THE PREFERRED EMBODIMENTS

Figure 1A:
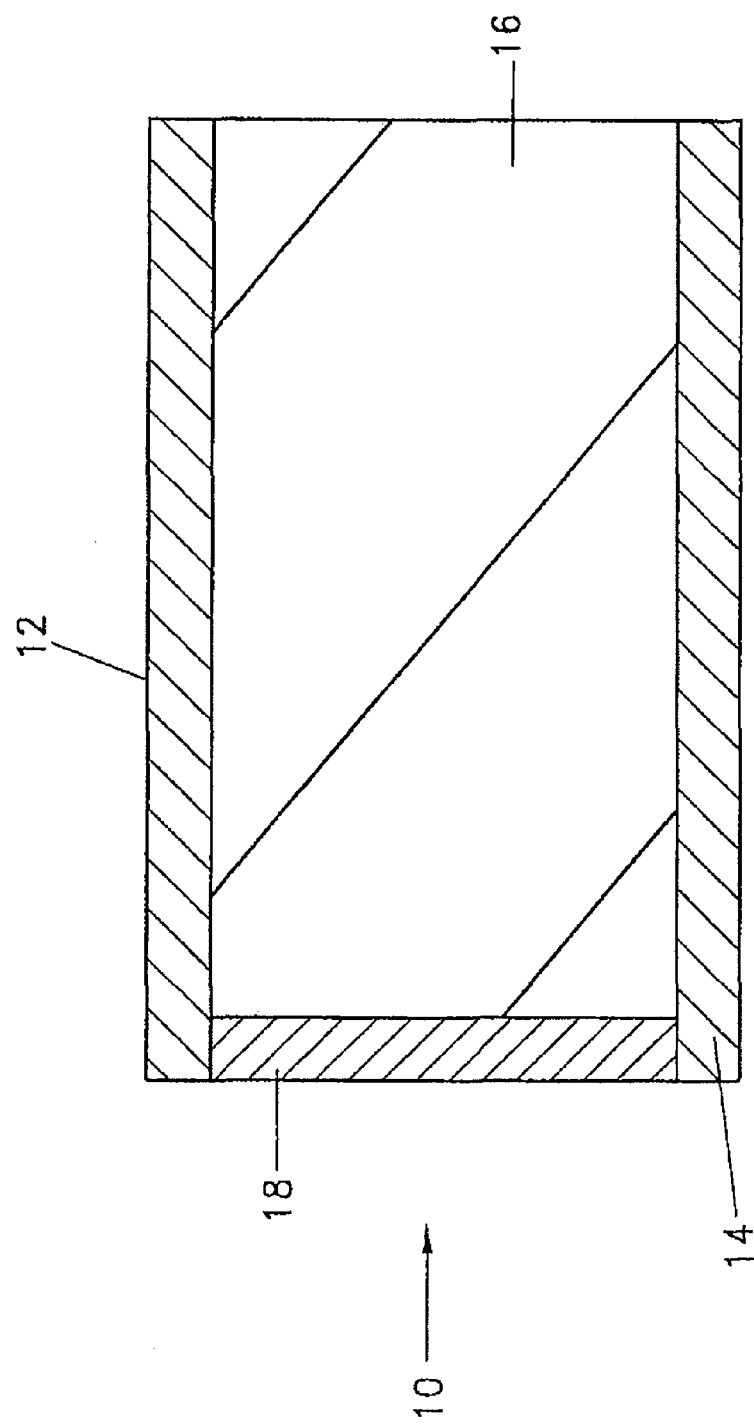
FIGS. 1A and 1B are cross-sectional views schematically illustrating a preferred optical element.

FIG. 1 illustrates a preferred optical element 10. In FIG. 1A, the optical element 10 includes a first rigid or flexible optical cover 12 which may be a transparent plate, a second rigid or flexible optical cover 14 which may be a transparent plate, and a layer of polymeric material 16 sandwiched between the first and second optical covers 12, 14. If desired, a barrier 18 may be used to contain the polymeric material 16 between the first and second plates 12, 14 prior to, and following, the curing described below. If desired, one or both of the first and second covers 12, 14 may comprise a curved surface which may exhibit a pre-existing refractive power. Thus, the first and second covers 12, 14 may each individually be ophthalmic lenses, e.g., a single vision lens, bifocal lens, or progressive addition lens, all of which may or may not include prism power. Alternatively, both of the first and second plates 12, 14 may be planar lenses having curved surfaces and without refractive power.

Figure 1B:
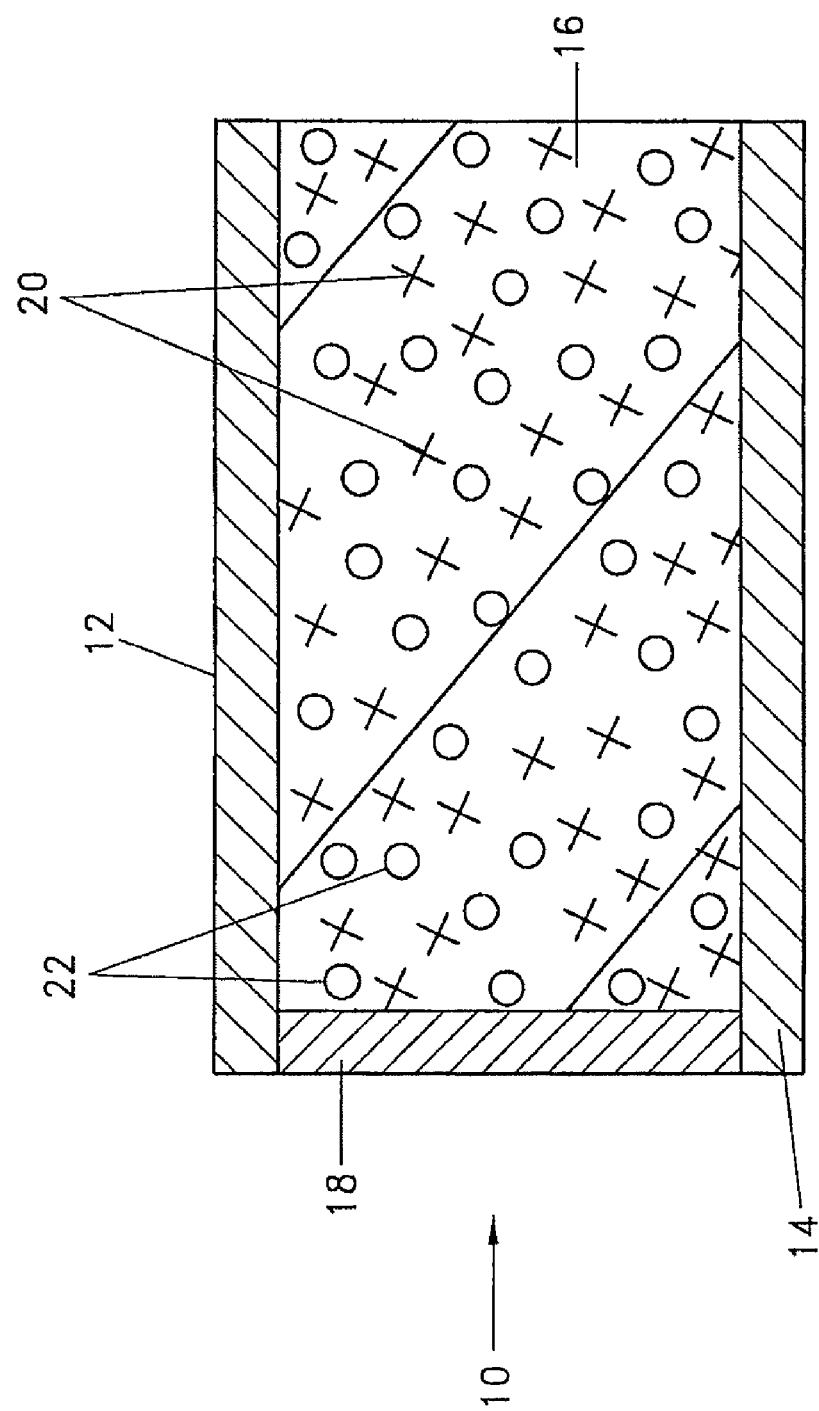

The polymeric material 16 is preferably made by polymerizing at least two curable constituents such as two monomers 20, 22 with respective polymerization initiators as illustrated in FIG. 1B. The refractive index of each of the two monomers 20, 22 changes during polymerization ("curing") to form the polymeric material 16. Curing is preferably conducted by exposing the two monomers 20, 22 to a radiation source, such that the degree of curing varies between locations within the polymeric material 16, as described in greater detail below. The index of refraction profile is determined by the degree of curing or polymerization of the two monomers. The first monomer 20 is preferably polymerized to form a first polymer having a spatially varying degree of cure that provides a predetermined refractive index profile, and the second monomer 22 is preferably uniformly polymerized or cured to form a second polymer, thereby stabilizing the first polymer and the refractive index profile. The polymeric material 16 thus comprises a mixture of the first polymer and the second polymer. Those skilled in the art will understand that the term "polymeric material" as used herein is a broad term that encompasses various monomers and polymers, as well as monomer/monomer, monomer/polymer, and polymer/polymer mixtures.

In the illustrated embodiment, the two monomers 20, 22 each cure by exposure to different wavelengths of light. By way of non-limiting example, the first monomer 20 can cure by exposure to relatively long ultraviolet wavelength light (e.g., "UVA") and the second monomer 22 can cure by exposure to relatively short ultraviolet wavelength light (e.g., "UVB"). The first monomer 20 can be, e.g., an acrylate or vinyl ether, and the second monomer 22 can be, e.g., a vinyl ether or an epoxy. Combinations of first and second monomers can include acrylates and epoxies, thiol-enes and esters, thiol-enes and epoxies, acrylates and vinyl ethers, and vinyl ethers and epoxies.

Other monomers that polymerize by photoinitiation may also be used. Suitable monomers include, for example, urethanes, thiol-enes, cellulose esters, mercapto-esters, and epoxies. The first monomer and/or the second monomer can be a monomer system that contains two or more monomers that react with one another. For example, thiol-ene is a preferred first monomer that comprises thiol monomers and ene monomers. A wide variety of thiol-ene monomers and polymers are known to those skilled in the art, see, e.g., Jacobine, A. T. in "Radiation Curing in Polymer Science and Technology: Photopolymerization Mechanisms," Eds. J. P. Fouassier and J. F. Rabek, Elsevier Applied Science: London, pp. 219-268 (1993). Preferably, the first and/or second monomers are photopolymers. The monomer may polymerize spontaneously upon irradiation, or, preferably, a photoinitiator may be used. Suitable photoinitiators include alpha cleavage photoinitiators such as the benzoin ethers, benzil ketals, acetophenones, and phosphine oxides; hydrogen abstraction photoinitiators such as the benzophenones, thioxanthones, camphorquinones and bisimidazole; and cationic photoinitiators such as aryldiazonium salts, arylsulfonium and aryliodonium salts, and ferrocenium salts. Alternatively, other photoinitiators such as the phenylphosphonium benzophene salts, aryl tert-butyl peresters, titanocene, or N-methylmaleimide may be used.

Figure 2:
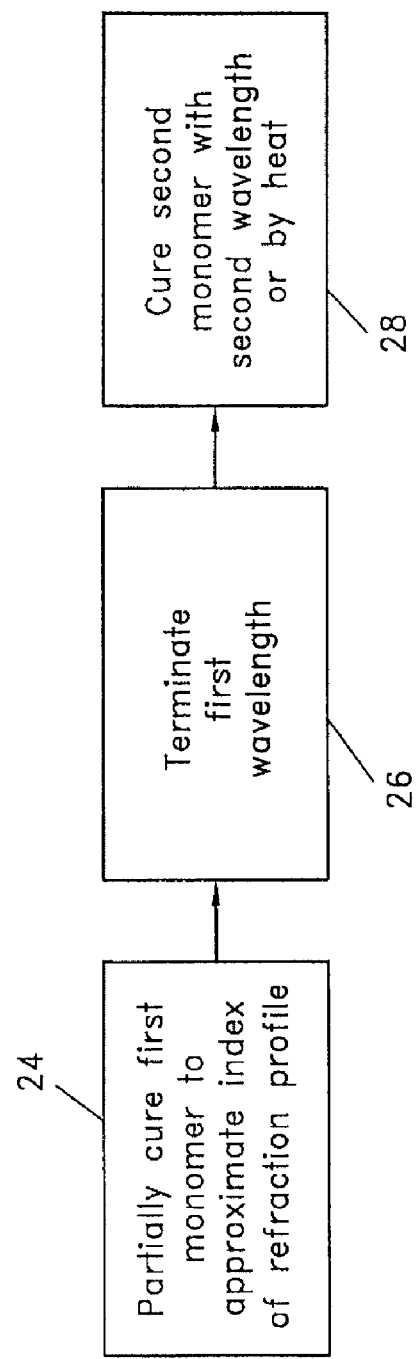
FIG. 2 is a flow chart illustrating a preferred method for making an optical element.

In a preferred embodiment, the polymerization process is controlled by the duration and intensity of the UV light exposure. More preferably, the polymerization should be substantially stopped when the UV light source is turned off. Thiol-ene polymerization systems, for example, exhibit this "step growth" characteristic. FIG. 2 is a flow chart illustrating a preferred method for making the optical element 10. At block 24 a light source selectively polymerizes the first monomer 20 to create a polymeric material 16 having a spatially varying degree of cure that provides a refractive index profile that approximates the refractive index profile desired for the resulting optical element 10. FIG. 1C schematically illustrates how such selective polymerization may be carried out. By subjecting areas in which a greater degree of polymerization is desired to higher levels of irradiation (indicated by multiple arrows 30 in FIG. 1C), and subjecting areas in which a lower degree of polymerization is desired to lower and intermediate levels of irradiation (indicated by a single arrow 35 and a double arrow 38, respectively), a polymer having a spatially varying degree of cure may be formed that provides a predetermined refractive index profile as illustrated in the plot shown in FIG. 1D. Suitable selective polymerization methods are disclosed in U.S. Patent Application Publication No. 2002/0080464 A1 and 2003/0143391 A1, which are hereby incorporated by reference in their entireties and particularly for the purpose of describing such methods. Since the monomer 20 has an index of refraction that changes upon polymerization, the refractive index in a particular region can be controlled by controlling the degree of polymerization or cure in that region by selective irradiation. Monomer 20 is preferably polymerized using a photoinitiator that responds to a first wavelength of light. The second monomer 22 may be present during the polymerization of the first monomer 20 or may be diffused into polymeric material 16 after polymerization of the first monomer 20. If present during the polymerization of the first monomer 20, second monomer 22 preferably undergoes little or no polymerization during the polymerization of the first monomer 20.

At block 26, the exposure to the first wavelength of light is terminated, ceasing the curing of the first monomer 20, thereby ceasing the change of the index of refraction. The refractive index profile of the optical element 10 at this stage approximates the desired refractive index profile. For example, as shown in FIG. 1C, the amount of first polymer 40 in the region of optical element 10 exposed to lower amounts of radiation 35 is less than in the regions exposed to greater amounts of radiation 30, 38. The spatially varying refractive index profile illustrated in the plot shown in FIG. 1D reflects the respective amounts of first polymer 40 in each region. Thus, by spatially varying the degree of cure of the first polymer 40, the refractive index profile at various points 42, 44, 46 generally corresponds with the intensity of incident radiation 35, 30, 38 (respectively). Then, at block 28 a light source is activated to irradiate the material 16 with a second wavelength of light that, preferably, substantially completely and uniformly cures the second monomer 22. An excess of light may be used in block 28 to ensure complete polymerization. However, less than 100% curing of the second monomer can also be effective to stabilize the index profile. For example, when the polymeric material 16 has a viscosity value of greater than about 20,000 centipoise prior to polymerization of the second monomer 22, a degree of cure of about 40% for the second monomer may be sufficient. In general, the higher the viscosity of the polymeric material 16, the lower the degree of curing of the second monomer 22 required to stabilize the refractive index profile. Preferably, the amount of the second monomer is about 15% or more by weight in relation to the first monomer, so that when the second polymer component is substantially completely cured, it forms a locking network throughout the entire polymer mixture and renders the first monomer/polymer component substantially immobile.

A preferred embodiment for making the polymer mixture 16 involves the use of a relatively low molecular weight first monomer that contains relatively few (preferably three or four) polymerizable functional groups per monomer molecule. For example, a preferred first monomer mixture may comprise thiol-ene, more preferably a thiol-ene comprising a thiol that contains three or four-SH groupss per molecule, and an ene that contains three or four carbon-carbon double bonds per molecule. Those skilled in the art are aware of additional examples, see Jacobine, A. T., in "Radiation Curing in Polymer Science and Technology: Photopolymerization Mechanisms," Eds. J. P. Fouassier and J. F. Rabek, Elsevier Applied Science: London, pp. 219-268 (1993). By using relatively low molecular weight first monomers, the magnitude of the refractive index change due to volume shrinkage or densification is maximized. Thus, monomers are preferably chosen to increase the dynamic range of the index of refraction change, or the delta-N value.

The second monomer (which may be a mixture of monomers) may comprise a macromer, e.g., a relatively low or intermediate molecular weight polymer that contains reactive groups such as an unsaturated bisphenol-A fumarate polyester (e.g., ATLAC, available commercially from Reichhold, Inc. Research Triangular Park, N.C.). A preferred ATLAC contains approximately 40 ene groups and is soluble in acetone and in various thiol-ene mixtures. Preferably, the second monomer has a relatively high viscosity, as compared to the first monomer, to thereby slow the diffusion of the low molecular weight components of the first polymer. For example, in a preferred thiol-ene/ATLAC combination, use of the relatively high viscosity ATLAC as the second monomer preferably slows the diffusion of portions of the thiol-ene monomer/polymer mixture (prepared by prior polymerization of the first thiol-ene monomer) that are uncured or cured to a relatively low degree Similar macromers containing reactive functional groups can be used as a component of the second monomer. Subsequent polymerization of the second monomer preferably forms a very high viscosity matrix that stabilizes the first polymer (and thereby stabilizing the refractive index profile) by slowing or preventing diffusion of the components of the first polymer, and particularly the lower molecular weight components of the first polymer (such as first monomer and oligomers thereof). Preferably, the degree of curing of the second monomer to form the second polymer is substantially uniform in a spatial sense, such that the degree of cure of the second polymer does not undesirably affect the intended refractive index profile.

The second polymer may also stabilize the first polymer by the formation of covalent bonding between them. For example, in preferred thiol-ene/ATLAC systems, upon photo-polymerization, the low molecular weight thiol and ene monomers polymerize to form a denser and more compact polymer, resulting in an increase in the index of refraction. The low molecular weight thiol and/or ene monomers, and/or the growing thiol-ene polymer, also preferably react with the ATLAC. The higher index regions formed by the thiol-ene polymerization are thus stabilized by the covalent bonding of such units to the ATLAC. Without the ATLAC, the low molecular weight thiol-ene units are relatively free to migrate by diffusion; hence the desired higher index of refraction regions tend to diffuse away over time, resulting in the stability problems discussed above.

Another method of stabilizing the refractive index profile formed by the spatially varying degree of cure is to use an entirely different type of polymer as the second component to stabilize the index profile. For example, one may first use a photo-polymerization process as described above to generate the desired index of refraction profile, then instead of using a second monomer that is cured by UV light to form a second polymer that provides increased stability, one can use a second monomer that is cured by heating as illustrated in block 28 in FIG. 2. One such example is an epoxy which is thermally curable, e.g., instead of ATLAC in the embodiment discussed above, a thermally curable epoxy is used instead. The steps used to form the desired index of refraction profile remain essentially the same, then heat is applied to cure the epoxy, thereby stabilizing the first polymer in an epoxy matrix.

One embodiment is to choose an epoxy that cures at relatively low (e.g., below 80.degree. C.) or close to room temperature. The thiol, ene, and epoxy is then kept near or below room temperature to prevent the curing of the epoxy. The index profile may then be created by activating the photo-initiator that induces the thiol-ene polymerization. When the desired index of refraction profile is reached, the system is warmed up slightly to reach the epoxy curing temperature, polymerizing the epoxy turns and freezing-in the thiol-ene polymer to thereby stabilize the index of refraction profile.

Another embodiment is a method of stabilizing the index of refraction profile by curing thermally. Once the index of refraction profile is written in the polymer mixture, it is preferable to avoid degrading the index profile. Heating the epoxy could potentially degrade the profile. One method of minimizing that risk is to perform the epoxy curing in two steps: First, the second polymer in the mixture is allowed to gel (partially polymerize) at room temperature after the writing of the index profile in the polymer, and then the temperature is raised, e.g., to about 60.degree. C. to 85.degree. C., to complete the full curing process. The gel state provides a high viscosity environment around the index profile and thereby decreases the diffusion rate of the first polymer, e.g., the photo-polymerized thiol-ene polymer. The complete curing at elevated temperature stabilizes the index profile.

The patent application entitled "Apparatus and Method for Curing of UV-Protected UV-Curable Monomer and Polymer Mixtures," Ser. No. 10/848,942, filed May 18, 2004, and the application to which it claims priority, U.S. Provisional Application No. 60/472,669, filed on May 21, 2003, are hereby incorporated by reference in their entireties, and particularly for the purpose of describing preferred methods for making the polymeric material 16.

Figure 3:
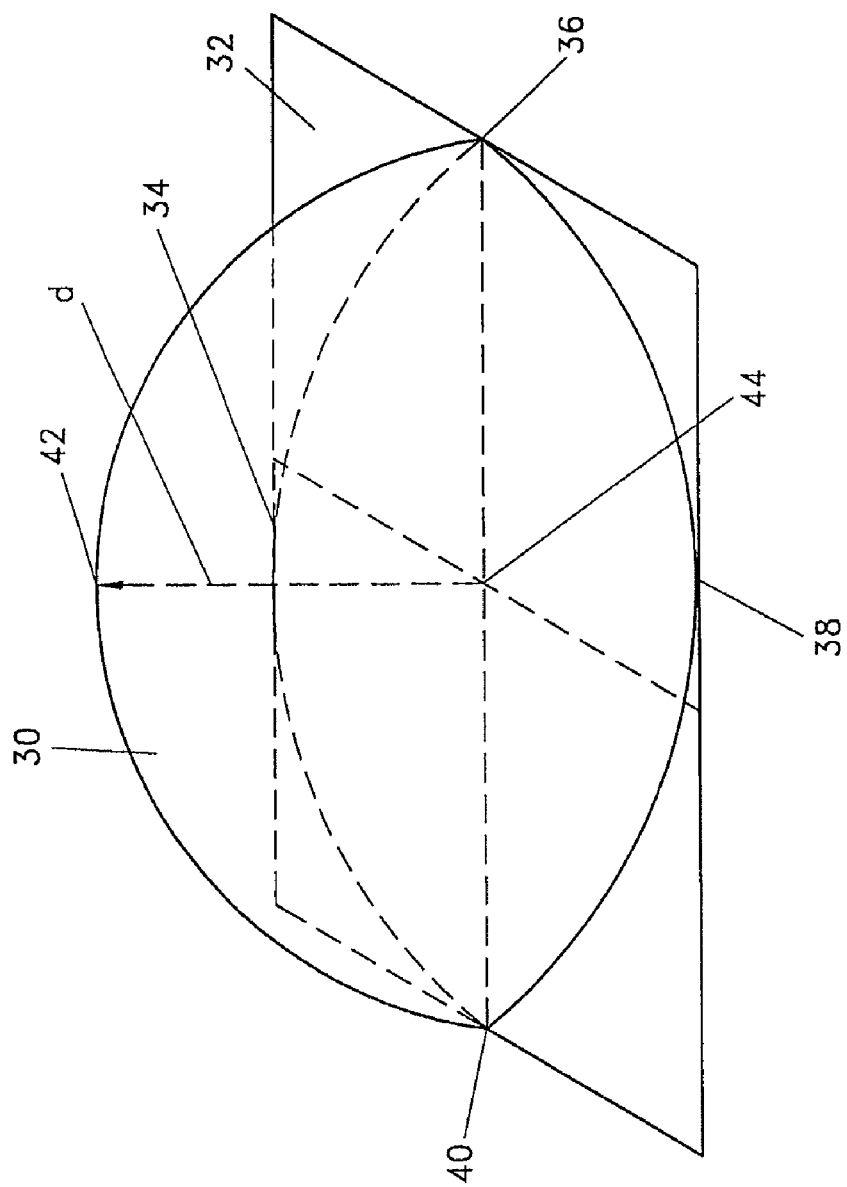
FIG. 3 is a schematic diagram illustrating aberrations in a wavefront.

Reference is made to FIG. 3 to illustrate how the desired refractive index profile can be determined. Those skilled in the art will understand from the discussion above that the first monomer 20 (which may be a mixture of monomers) is partially cured in a manner that varies spatially to achieve the desired refractive index profile, and that the curing of the second monomer 22 (which may also be a mixture of monomers) may change the refractivity somewhat. Preferably, an overall profile is obtained that is the combination of the desired refractivity index distribution resulting from selective polymerization of the first monomer 20 and the added change in refractivity over the entire material 16 that results from the curing of the second monomer 22.

A schematic illustration of a wavefront 30 is shown in FIG. 3, showing a divergent wave which may consist of spherical, astigmatism and high order aberrations. The higher order aberrations are typically describable by third and higher order terms of Zernicke polynomials. At an imaginary cross sectional plane 32, the wavefront has intersections located at points 34, 36, 38, 40. The peak of the wavefront is indicated at 42, which is traveling ahead of the intersections 34, 36, 38, 40. The distance between the peak 42 and the intersections is typically expressed in the units of physical distance in space. The peak 42 has a projected point 44 on the plane 32.

Figure 4:
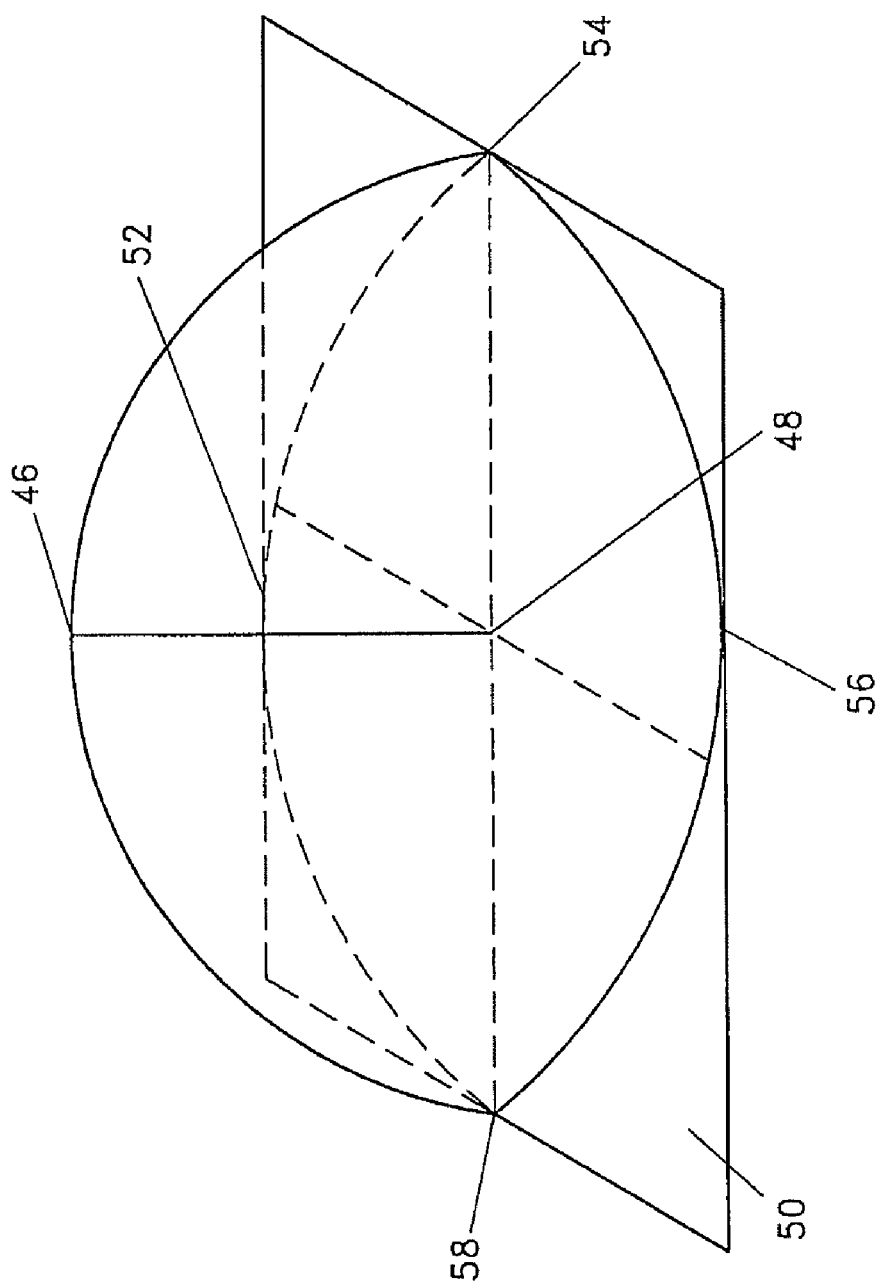
FIG. 4 is a schematic diagram illustrating an index of refraction profile for a preferred lens that compensates for the aberrations shown in FIG. 3.

To correct the aberrations in this wavefront, a refractive index profile is created in the material 16 that will slow down the peak 42. Accordingly, the desired refractive index profile for a portion of the material 16 is one that exhibits, after curing, an index of refraction that results in the conjugate of the wavefront 30 such that a plane wave exits the optical element 10. An illustrative curing profile is shown in FIG. 4, which has a three dimensional distribution profile 46 that is essentially identical to that of the profile of the wave 30 shown in FIG. 3.

Specifically, in one preferred, non-limiting embodiment, the retardation required for compensation can be calculated as follows. The difference of the index of refraction, .DELTA.n between cured and uncured material 16 is typically in the range of 0.001 to 0.05 and may be determined by routine experimentation. The retardation is the physical distance "d" between the wave peak 42, and its projection point 44 on the plane 32. The thickness of the material 16 consequently is at least d/.DELTA.n. In the curing profile for the material 16, the scale of the magnitude of the retardation is such that the magnitude of thickness of the cured material or the integrated index difference at a profile peak 46 to its projection 48 on a cross-sectional plane 50 is d/.DELTA.n. The effect of such a refractive index profile is that the peak 42 of the wave 30 will experience the most retardation, and the wave at the intersections 34, 36, 38, 40 experiences no retardation at corresponding locations 52, 54, 56, 58 of the refractive index profile in the uncured portion of the material 16. Accordingly, the desired refractive index profile of the material 16 after curing is such that its index of refraction establishes a profile that matches the profile of the wave for which compensation is desired.

The curing can be undertaken using a light source in combination with a beam shaping unit. Preferably, the light source with beam shaping unit creates a light beam that is substantially collimated. It should be appreciated, however, that a non-collimated beam may also be used if desired. In one exemplary, non-limiting embodiment, the light beam may pass through a focusing lens to form a converging, or focusing, light beam that is directed toward the optical element 10, where the light beam passes through the first transparent plate 12 to focus on a desired volume in the material 16. This irradiates the monomer at that location, preferably activating the photoinitiator and beginning the curing process within the material 16. The curing process results in a corresponding change of the index of refraction within the material. Terminating the exposure to the light ceases the curing, thereby ceasing the change of the index of refraction.

The activation and power level of the light source and its position are preferably controlled by a controller which is electrically connected to the light source and to shuttling components on which the source may be mounted. In a preferred embodiment, the converging light beam passes through the transparent plate 12 and converges within the material 16. Specifically, the light ray edges of the beam converge at the desired focal point to cure the material 16 at the focal point. Then, the light beam is moved to another point adjacent to the just-cured point to cure the next point, and so on. The details of various methods of light energy delivery by beam scanning have been disclosed in U.S. Patent Application Publication No. 2003/0143391 A1, which is hereby incorporated by reference in its entirety and particularly for the purpose of describing such methods.

While the term "focal point" is used herein, it is to be understood that the light beam at its point of focus is not at a true "point", which in mathematics has no volume, but rather is focused in a volume referred to as a "beam waist" which represents the region in the material 16 undergoing by exposure to the converging light beam. Generally speaking and without limitation, a beam with a cone angle that is in the range of 0.002 radians to 1.5 radians may be used.

Preferably, the distance between curing volumes should be less than the beam waist of the light beam, creating an overlap region. In a preferred embodiment, the size of the beam overlap region can vary in the range of about ten to about seventy five percent (10%-75%) of the size of the beam waist. In a particularly preferred, non-limiting embodiment, the size of the beam overlap region can vary in the range of about forty to about sixty percent (40%-60%) of the size of the beam waist. In one embodiment in which a tightly focused beam is preferred, the beam waist is in the range of twenty microns (20 .mu·m) or less. However, beam waists in the range of about 0.1 micron to about two hundred microns may be used. It is to be understood that the curing volumes can be sequential and contiguous to each other, or the scan sequence may be randomly accessed, such that the new curing location can be isolated from the previous location, with no overlap of the beam waists.

Other methods for selectively curing the monomers (e.g., a photomask) may also be used. Suitable selective polymerization methods are disclosed in U.S. Patent Application Publication No. 2002/0080464 A1, which is hereby incorporated by reference in its entirety and particularly for the purpose of describing such methods.

Preferred methods may be used to correct aberrations in optical components such as telescopes, microscopes, ophthalmic diagnostic instruments including confocal scanning opthalmoscopes, and fundus cameras. In such cases, the viewing instrument generally includes refractive elements such lenses, reflective elements such as mirrors and beam splitters, and diffractive elements such as gratings and acousto- and electro-optical crystals. Preferred embodiments may be used to eliminate costly manufacturing of such apparatus by using less costly optics and by compensating for the attendant residual aberrations with correcting elements such as are described above. In a preferred embodiment, the optical element 10 shown in FIG. 1 is a correcting element configured as, for example, an ophthalmic lens, to correct aberrations caused by imperfections in a patient's eye.

It will be appreciated by those skilled in the art that various omissions, additions and modifications may be made to the processes described above without departing from the scope of the invention, and all such modifications and changes are intended to fall within the scope of the invention, as defined by the appended claims.

The invention claimed is:

1. An optical element comprising:
    a first monomer polymerized while in the presence of a second monomer to form a first polymer intermixed with the second monomer, the first polymer having a spatially varying degree of cure that provides a predetermined refractive index profile; and
    the second monomer polymerized in the presence of the first polymer to form a second polymer intermixed with the first polymer, the second polymer stabilizing the refractive index profile.

2. The optical element of claim 1 in which the second monomer and first polymer are sandwiched between first and second cover plates during the polymerizing of the second monomer.

3. The optical element of claim 2 in which the first and second cover plates are ophthalmic lenses.

4. The optical element of claim 1 in which the polymerizing of the first monomer is conducted by exposing the first monomer to a first radiation source.

5. The optical element of claim 4 in which the first monomer comprises a photoinitiator.

6. The optical element of claim 4 in which the polymerizing of the second monomer is conducted by exposing the second monomer to a second radiation source different from the first radiation source.

7. The optical element of claim 1 in which the first monomer is selected from the group consisting of epoxy, thiol, ene, acrylate, vinyl ether and mixtures thereof.

8. The optical element of claim 1 in which the second monomer is selected from the group consisting of epoxy, acrylate, ester, and vinyl ether.

9. The optical element of claim 1 comprises intermixing the first and second monomer prior to the polymerizing of the first monomer.

10. The optical element of claim 1 in which the first polymer is a thiol-ene polymer and the second polymer is selected from the group consisting of epoxy polymer and unsaturated polyester.

11. An ophthalmic lens, comprising:
a first optical cover and a second optical cover;
a mixture sandwiched between the first and second optical covers comprising a first monomer, a second monomer, a first photoinitiator, and a second photoinitiator;
the mixture being exposed to a first radiation source, thereby polymerizing the first monomer while in the presence of the second monomer to form a first polymer intermixed with the second monomer, the first polymer having a spatially varying degree of cure that provides a predetermined refractive index profile; and
the mixture being exposed to a second radiation source, thereby polymerizing the second monomer to form a second polymer intermixed with the first polymer.

12. The optical element of claim 11 in which substantially all of the second monomer is consumed by the second polymerizing of the mixture.

13. The optical element of claim 11 in which the second polymer is partially cured.

14. The optical element of claim 11 in which the first and the second optical covers are selected from the group consisting of transparent plate, plano ophthalmic lens, single vision ophthalmic lens, bifocal ophthalmic lens, and progressive addition ophthalmic lens.

15. The optical element of claim 11 in which the polymerization of the second monomer is performed immediately after the polymerization of the first monomer.

16. The optical element of claim 11 in which the polymerization of the second monomer is performed after a predetermined waiting period after the polymerization of the first monomer.

17. The optical element of claim 11 in which the exposure of the mixture to first and second radiation source is performed without removing and refilling the optical element with a second monomer after the polymerizing the first monomer.

18. The optical element of claim 11 in which the first polymer and the second polymer form a pair selected from the group consisting of polyacrylates/epoxy, polyacrylates/polyvinyl ether, thiol-ene polymer/polyester, thiol-ene polymer/epoxy, and polyvinyl ether/epoxy.

19. The optical element of claim 11 in which the first polymer is selected from the group consisting of thiol-ene polymer, epoxy, polyacrylates and polyvinyl ether.

20. The optical element of claim 11 in which the second polymer is selected form the group consisting of epoxy, polyester, polyacrylates and polyvinyl ether.

* * * * *